3,032,542
ANIONIC POLYMERIZATION OF VINYLIDENE COMPOUNDS
William E. Goode, Beverly, N.J., assignor to Rohm & Haas Company, Philadelphia, Pa., a corporation of Delaware
No Drawing. Filed Apr. 11, 1957, Ser. No. 652,102
11 Claims. (Cl. 260—89.5)

This invention concerns a method for the anionic polymerization of acrylic esters and various other vinylidene compounds, wherein quaternary ammonium salts of very weak acids are used as initiators.

Alkali and alkaline earth metal salts of weak acids have previously been proposed as initiators for polymerizing acrylic derivatives. It is, of course, desirable to remove the metal or metal salts. This is in many situations rather difficult. An initiator system has now been discovered which does not leave inorganic materials in the polymer with many consequent advantages and the components of which can, if desired, usually be readily extracted. This initiator system can furthermore be used over a wide range of temperatures and can be used for polymerizations in bulk or in solution. Polymerization is carried out with good control with this system.

It has already been found in connection with theoretical studies that quaternary ammonium salts in which the anion is a hydrocarbon group, as the anion of a weak acid (in the Lewis sense), can be prepared by reacting a quaternary ammonium halide with an alkali metal hydrocarbon. For example, triphenylmethyl sodium has been reacted with tetraalkylammonium chlorides to give sodium chloride and tetraalkyl ammonium triphenylmethyls. It is quaternary ammonium salts of this type which have been found to be highly versatile initiators.

According to this invention a vinylidene compound of the structure

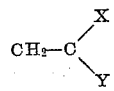

where X is hydrogen or lower alkyl, particularly the methyl group, and Y is an electron-attracting group from the class consisting of cyano, alkoxycarbonyl, acyl, and nitro is treated in bulk or in solution in an inert organic solvent with a quaternary ammonium salt of a weak acid having a $pK_a$ from 20 to about 35 under anhydrous and anaerobic conditions.

The polymerization can be carried out between about —90° and about 100° C., preferably between —70° C. and about 70° C. The temperature used depends upon the monomer, the solvent selected, if any, and on the molecular weight desired. For those monomers which polymerize relatively readily a lower temperature range may be used than for less readily polymerizable monomers. When large molecular weights are desired, polymerization will in general be carried out in a lower temperature range than in a higher. Of course, the use of a solvent and the choice of a solvent also bear on the question of molecular size of polymer.

The chief requirements for a solvent, when used, are that it be at least a solvent for the monomer and be inert; that is, it does not supply protons which would act to destroy the initiator or to terminate growing chains. This requires that there be absent water, alcohols, or amides with available hydrogen and that the inert solvent used be free of such impurities.

As solvents there can be used paraffinic and aromatic hydrocarbons, which usually and preferably are volatile, ethers, including dioxane and dimethoxyethane, amines such as trimethylamine or triethylamine, and liquid ammonia.

Monomers which are polymerized comprise esters of acrylic and methacrylic acid, such as methyl, ethyl, propyl, isopropyl, n-butyl, isobutyl, sec-butyl, tert-butyl, hexyl, octyl, nonyl, dodecyl, and stearyl acrylates and methacrylates, comparable cyclopentyl, cyclohexyl, and dicyclopentanyl esters, the benzyl esters, acrylonitrile, methacrylonitrile, vinyl ketones, such as methyl vinyl ketone or ethyl vinyl ketone, and nitro-olefins, such as nitroethylene or 2-nitropropene.

The initiators used may be assigned the general structure

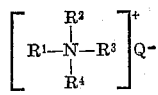

where $R^1$, $R^2$, $R^3$, and $R^4$ when taken individually may be alkyl, cycloalkyl, aralkyl, or phenyl, or when two of these R groups are taken together, they represent a saturated divalent aliphatic chain of four to five atoms, specifically —$CH_2CH_2CH_2CH_2$—, —$CH_2CH_2CH_2CH_2CH_2$—, and —$CH_2CH_2OCH_2CH_2$—, or such chains carrying one or more lower alkyl groups, and Q is a conjugate anion of an acid having a $pK_a$ from about 20 to about 35. For methods of preparation one may refer to Schlenk and Holtz, Ber. 49, 603 (1916) and 50, 274 (1917).

It should be commented that as anions of weaker and weaker Lewis acids supplying hydrogen are used, it is desirable to have N-substituents which do not provide stronger Lewis acids than that from which the anion is obtained. Under some conditions, it is possible for an N-substituent yielding a stronger Lewis acid than the acid of the anion to lead to a different sort of compound by interaction of the N-group and the anion and the quaternary ammonium salt will not be as stable as might be desired. In general, however, any alkyl group, aralkyl or cycloalkyl group can be attached to the nitrogen and one or more phenyl groups. In place of these hydrocarbon groups there may be used with a proper anion an alkenyl or ether-containing group. Usually, it is desirable that the quaternary ammonium compound be of relatively small molecular weight and for this reason it is advantageous to have as N-substituents lower alkyl (of not over four carbon atoms), phenyl, cyclohexyl, or benzyl groups or to have an N-heterocyclic group present.

Typical quaternary ammonium groups include tetraalkylammonium, especially with alkyl groups of not over four carbon atoms, trialkylbenzylammonium or dialkyldibenzylammonium in which groups one or two of the alkyl groups may be long-chained, as in hexyl, octyl, decyl, dodecyl, tetradecyl, or hexadecyl groups, phenyltrialkylammonium, phenylbenzyldialkylammonium, cycloalkyltrialkylammonium or dicycloalkyldialkylammonium with an alkyl group which may, if desired, be long-chained, benzylcycloalkyldialkylammonium, dialkylmorpholinium, alkylbenzylmorpholinium, alkylcycloalkylmorpholinium, dialkylpyrrolidinium, alkylbenzylpyrrolidinium, dialkyl piperidinium, alkylbenzylpiperidinium, or these heterocyclic quaternary ammonium groups in which one (or more) lower alkyl groups is carried on the heterocycle.

The anion, Q, may be that of any of the weak acids with a $pK_a$ from about 20 to about 35, typical of which are those derived from indene, phenylacetylene, diphenylamine, fluorene, xanthene, triphenylmethane, diphenylmethane, and toluene.

The amount of initiator used may be varied from about 0.01% to 10%, preferably 0.1% to 5%, of the weight of the monomer to be polymerized. The initiator is most readily mixed with monomer in the form of a solution or suspension in an inert solvent. It may be added in one portion or in several portions to start polymerization and to continue it. Initiator remaining in the polymer may be removed by washing, as with a dilute aqueous acid solution.

Additional details of procedure are given in the examples which follow. These are presented for purposes of illustration and not by way of limitation. Parts shown are by weight unless otherwise designated.

*Example 1*

Trityl tetramethyl ammonium was prepared by treating 2.4 parts of tetramethyl ammonium bromide with 2.1 parts of trityl sodium in 15 parts of ether at 25° C. under an atmosphere of nitrogen. The red solid which separated was freed of unreacted trityl sodium by repeated washings with anhydrous ether in a stream of nitrogen. The washed solid then was suspended in 200 parts of dry toluene, and 50 parts of methyl methacrylate were added. The temperature was maintained at 50° C. during addition of the monomer and for three hours thereafter. The viscous, yellow reaction mixture then was poured into a large volume of methanol, and the solid which separated was collected in a filter. Removal of inorganic and colored impurities from the polymer was accomplished by washing with hot 5% hydrochloric acid, followed by repeated washing with deionized water. After drying, 42 parts of poly(methyl methacrylate) was obtained. This polymer is a hard, clear thermoplastic solid which is soluble in aromatic hydrocarbons and chloroform. It has a molecular weight of about 60,000. It extrudes well.

*Example 2*

Fluorenyl 1,2-dimethyl-1-ethylpiperidinium was prepared by reaction of 9.7 parts of 1,2-dimethyl-1-ethyl-piperidinium iodide with an ethereal solution containing 6.2 parts of fluorenyl lithium. The orange-red solid which formed was washed with pure ether and suspended in 250 parts of dried toluene. Methyl methacrylate (50 parts) was added slowly; it was necessary to employ a cold water bath to maintain the reaction mixture at room temperature. After stirring for three hours the viscous solution was diluted with 200 parts of toluene and poured slowly into a large volume of stirred methanol. The precipitated polymer was collected and dried. Seventeen parts of poly(methyl methacrylate) were obtained. It has a molecular weight (viscosity average) of about 133,000 and molds well, the polymer flowing well through small orifices. In place of the above initiator there may be used with the same result fluorenyl 1,1-dimethylmorpholinium or fluorenyl 1,1-dimethylpyrrolidinium.

*Example 3*

A suspension of 44 parts of 9-fluorenyl tetraethyl-ammonium was prepared by reacting equimolar quantities of tetraethylammonium bromide and 9-fluorenyl lithium at room temperature in 2500 parts of anhydrous toluene. To this suspension was added slowly 500 parts of methyl methacrylate. The temperature rose to 40° C. and the solution became red-orange. After 18 hours the reaction mixture was poured into a large volume of methanol and the precipitated polymer was purified by solution in toluene and reprecipitation. After drying, there was obtained 220 parts of poly(methyl methacrylate), having a molecular weight of 90,000.

*Example 4*

Trimethylphenylammonium iodide (9.5 parts) was treated with an ethereal solution containing 6.2 parts of 9-fluorenyl lithium. The orange solid which separated was washed thoroughly with ether and suspended in 220 parts of anhydrous toluene. To this suspension 50 parts of methyl methacrylate were added; the temperature of the reaction mixture rose rapidly to a maximum of 56° C. After several hours the viscous solution was poured into methanol and the solid which precipitated was washed and dried in the manner described in Example 1. The yield of poly(methyl methacrylate) was 34.1 parts, having a molecular weight of about 75,000.

*Example 5*

A mixture of 7.5 parts of ethylmethylphenylbenzylammonium chloride and 6.75 parts of trityl sodium in 50 parts of ether was stirred at 30° C. under an atmosphere of nitrogen. The supernatant liquid became colorless, and a red solid separated. The reaction mixture was cooled to −70° C. with a Dry Ice-acetone bath, and 50 parts of methyl methacrylate were added. Polymerization occurred immediately. After several hours the viscous solution was poured into methanol, and the polymer which separated was collected, dissolved again in toluene and reprecipitated in methanol. Eight and one-tenth parts of dried poly(methyl methacrylate) were obtained. This polymer has a molecular weight of over 880,000. It is a hard, tough plastic. It has good coating qualities.

*Example 6*

Tetra-n-butylammonium iodide (4.0 parts) was treated at −70° C. with a solution of 3.0 parts of trityl sodium in ether. A red solid appeared, and the supernatant liquid became colorless. Fifty parts of methyl methacrylate were added; a rapid polymerization occurred, and the temperature rose to −35° C. The reaction mixture was poured into methanol and the solid polymer which separated was purified by solution in acetone and precipitation in water. Forty-six parts of poly(methyl methacrylate) were obtained. This polymer has a molecular weight of about 125,000. It is suitable for molding and coating operations, exhibiting excellent flow and mold filling qualities.

*Example 7*

To a stirred suspension of 88.5 parts of 9-fluorenyl tetraethylammonium in 2500 parts of toluene maintained under an atmosphere of nitrogen at −57° C., there was added 500 parts of ethyl acrylate. The reaction mixture was held at this temperature for one hour, then was allowed to warm to 15° C. during two hours. The viscous liquid was poured into a large volume of vigorously agitated petroleum ether and the polymer which separated was removed by filtration, washed with dilute hydrochloric acid and with water, and dried. The yield of poly(ethyl acrylate) was essentially quantitative. The polymer is rubbery with a molecular weight over 300,000.

*Example 8*

To a stirred mixture of 86 parts of anhydrous toluene and 2.8 parts of tetraethylammonium idoide under an atmosphere of nitrogen at 25° C. was added a solution consisting of 2.1 parts of trityl sodium in 12.5 parts of diethyl ether. A bright red finely divided solid, trityl tetraethylammonium, separated from solution. The absence of a red coloration in the supernatant liquid indicated that no unreacted trityl sodium remained.

The reaction mixture was cooled to −70° C. by means of a Dry Ice-acetone bath, and 50 parts of ethyl acrylate was added. The temperature rose to −40° C., with a simultaneous increase in viscosity. After twenty-five minutes the reaction mixture was poured into a large volume of petroleum ether, and the solid which precipitated was dried in a vacuum desiccator. There was obtained 15 parts of a rubbery polymer with a molecular weight above 500,000.

Repetition of this procedure with trityl dimethylethylbenzylammonium gives a similar polymer, also of high molecular weight.

*Example 9*

To a mixture of 87 parts of distilled and dried toluene and 2.8 parts of tetraethylammonium iodide under nitrogen at −70° C. was added a solution consisting of 2.2 parts of trityl sodium and 17.5 parts of diethyl ether.

The temperature was allowed to rise to 15° C. where it was held while 50 parts of n-butyl methacrylate was added during three minutes. The solution immediately became viscous. Stirring was continued for sixteen hours, then the solution was filtered and poured into a large volume of methanol. A yellow rubbery mass precipitated, and was washed with 250 parts of hot 5% hydrochloric acid, water, and methanol. Twenty-four parts of a poly(n-butyl methacrylate) were obtained after drying in a vacuum desiccator. It is a rubbery polymer with a molecular weight of about 200,000. It flows well for making semi-rigid moldings.

*Example 10*

Acrylonitrile (500 parts) was added at room temperature to a stirred suspension of 10.6 parts of fluorenyl tetraethylammonium in 2500 parts of toluene under an atmosphere of nitrogen. The temperature of the reaction mixture was kept below 60° C. by intermittent application of a cold water bath. After stirring for several hours, the viscous solution was poured into a large quantity of methanol. The precipitated polymer was collected, purified by refluxing with dilute hydrochloric acid followed by washing with water, and dried. There was obtained 235 parts of light yellow polyacrylonitrile.

Repetition of this procedure with substitution of methacrylonitrile goes even better and leads to a hard polymer.

*Example 11*

A solution of 0.78 parts of potassium metal in 100 parts of anhydrous liquid ammonia under nitrogen at −33° C. was titrated to the disappearance of the blue color with a solution of 3.38 parts of diphenylamine. To this yellow solution of potassium diphenylamide was added with stirring during ten minutes 8.4 parts of tetraethylammonium bromide. A yellow solid separated, leaving a clear, colorless supernatant liquid. This solid was the initiator, tetraethylammonium diphenylamide.

To the suspended initiator was added during three minutes 50 parts of methyl methacrylate. Polymerization occurred immediately with the formation of an insoluble polymer. The ammonia was allowed to evaporate and the polymer was washed with water, dissolved in acetone, precipitated from methanol, and dried in a vacuum desiccator. There was obtained 25 parts of poly-(methyl methacrylate), a hard polymer with a molecular weight of 71,000.

*Example 12*

To a stirred solution of 129 parts of anhydrous toluene and 2.8 parts of tetraethylammonium iodide under a protecting atmosphere of nitrogen is added a solution of 2.1 parts of trityl sodium in 12.5 parts of diethyl ether. Trityl tetraethylammonium separates from the solution.

The mixture is cooled to −10° C. and 50 parts of methyl acrylate is added. Polymerization ensues as shown by rise of temperature and increase in viscosity. After 20 hours the solution is treated with three volumes of methanol. Polymer precipitates. It is centrifuged and the collected solid is washed with aqueous 5% hydrochloric acid, water, and methanol and is dried. The polymer is soluble in aromatic hydrocarbons, also in chlorinated hydrocarbons.

Repetition of the above procedure with tert-butyl acrylate in place of the methyl acrylate leads to a similar polymer.

In place of the acrylic esters shown above there may be used other acrylates and methacrylates. For example, benzyl methacrylate gives a relatively hard polymer, as does also cyclohexyl methacrylate. Octyl acrylate and dodecyl acrylate give rubbery to gummy polymers, which are soluble in typical hydrocarbon solvents, as are also dodecyl methacrylate and stearyl methacrylate which are waxy and firm. Methacrylonitrile polymerizes in the same way as acrylonitrile.

*Example 13*

Tetraethylammonium fluorenyl was prepared and 10.6 parts of it mixed at 25° C. with 250 parts of a dodecyl methacrylate made from a close-cut alcohol from reduction of coconut oil acids. The reaction mixture was blanketed with nitrogen and the monomer was extended with 800 parts of toluene. Polymerization was complete within a half hour. The reaction mixture was poured into about seven volumes of methanol. A rubbery precipitate resulted, which when dried became waxy. It was poly(dodecyl methacrylate) which was soluble in lubricating oils, increasing the viscosity thereof and improving the viscosity index. It has some pour depressing activity in waxy oils.

Repetition of the above procedure with dodecyl acrylate in place of the methacrylate gave a similar, but softer polymer. It is also oil-soluble and of value in lubricating oils.

*Example 14*

The procedure of Example 6 was followed with tetra-n-butylammonium fluorenyl as catalyst in an amount of five parts. The polymer has a molecular weight of 160,000 and is a good molding material.

Repetition with tetra-n-butylammonium benzyl as catalyst gives a similar result and an equally moldable polymer.

I claim:

1. A process for preparing polymers which comprises treating a vinylidene monomer of the structure

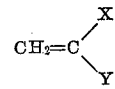

in which X is selected from the group consisting of hydrogen and lower alkyl and Y is an electron-attracting grouping selected from the group consisting of cyano, carboalkoxy, acetyl, propionyl, and nitro groups under anhydrous and anaerobic conditions between −90° C. and about 100° C. with a quaternary ammonium compound, as polymerization initiator, of the structure

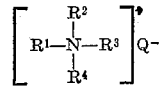

wherein $R^1$, $R^2$, $R^3$, and $R^4$ when taken individually are members of the class consisting of alkyl, cycloalkyl, aralkyl, and phenyl groups, and when two of these are taken together, they represent a member of the class consisting of —CH$_2$CH$_2$CH$_2$CH$_2$—,

and —CH$_2$CH$_2$OCH$_2$CH$_2$—, which with the nitrogen forms a heterocycle, and Q is an anion of a weak, organic acid of the formula QH having a pK$_a$ of 20 to 35.

2. A process according to claim 1 in which the weight of the quaternary ammonium compound is from about 0.01% to about 10% of the weight of the vinylidene monomer.

3. A process for preparing polymers of esters of acrylic acid and a saturated monohydric alcohol of not over 18 carbon atoms which comprises initiating polymerization of a said ester under anhydrous and anaerobic conditions between −70° and about 70° C. with a quaternary ammonium compound, as polymerization initiator, of the structure

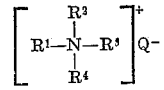

wherein $R^1$, $R^2$, $R^3$, and $R^4$ when taken individually are members of the class consisting of alkyl, cycloalkyl, aralkyl, and phenyl groups and, when two of these are taken together, they represent a member of the class consisting of —CH$_2$CH$_2$CH$_2$CH$_2$—,

—CH$_2$CH$_2$CH$_2$CH$_2$CH$_2$— and —CH$_2$CH$_2$OCH$_2$CH$_2$—, which with the nitrogen forms a heterocycle, and Q is an anion of a weak, organic acid of the formula QH having a pK$_a$ of 20 to 35, the weight of the quaternary ammonium compound being about 0.1% to about 5% of the weight of the ester.

4. A process according to claim 3 in which polymerizing is effected in an inert organic solvent for the ester.

5. A process for polymerizing alkyl acrylates which comprises polymerizing an alkyl acrylate under anhydrous and anaerobic conditions between —70° and about 70° C. with 0.01% to 10% by weight of the alkyl acrylate of a tetraalkylammonium hydrocarbon of the formula (alkyl)$_4$NQ as polymerization initiator in which the alkyl groups contain not over four carbon atoms each and Q is the hydrocarbon anion of a weak, organic acid of the formula QH having a pK$_a$ value of 20 to 35.

6. A process for preparing polymers of alkyl esters of methacrylic acid which comprises polymerizing a said ester under anhydrous and anaerobic conditions between —70° C. and about 70° C. with a quaternary ammonium compound, as polymerization initiator, of the structure

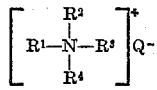

wherein R$^1$, R$^2$, R$^3$, and R$^4$ when taken individually are members of the class consisting of alkyl, cycloalkyl, aralkyl, and phenyl groups and, when two of these are taken together, they represent a member of the class consisting of —CH$_2$CH$_2$CH$_2$CH$_2$—,

—CH$_2$CH$_2$CH$_2$CH$_2$CH$_2$—

—CH$_2$CH$_2$OCH$_2$CH$_2$—, which with the nitrogen forms a heterocycle, and Q is an anion of a weak, organic acid of the formula QH having a pK$_a$ of 20 to 35, the weight of the quaternary ammonium compound being about 0.1% to about 5% of the weight of the ester.

7. A process for polymerizing alkyl methacrylates which comprises polymerizing an alkyl methacrylate under anhydrous and anaerobic conditions between —70° and about 70° C. with 0.01% to 10% by weight of the alkyl methacrylate of a tetraalkylammonium hydrocarbon of the formula (alkyl)$_4$NQ as polymerization initiator in which the alkyl groups contain not over four carbon atoms each and Q is the hydrocarbon anion of a weak, organic acid of the formula QH having a pK$_a$ value of 20 to 35.

8. A process for forming polymers of methyl methacrylate, which comprises polymerizing methyl methacrylate under anhydrous and anaerobic conditions between —70° C. and about 70° C. with a quaternary ammonium compound of the structure

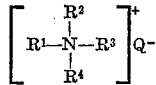

wherein R$^1$, R$^2$, R$^3$, and R$^4$ when taken individually are members of the class consisting of alkyl, cycloalkyl, aralkyl, and phenyl groups and, when two of these are taken together, they represent a member of the class consisting of —CH$_2$CH$_2$CH$_2$CH$_2$—,

—CH$_2$CH$_2$CH$_2$CH$_2$CH$_2$—, —CH$_2$CH$_2$OCH$_2$CH$_2$— which with the nitrogen forms a heterocycle, and Q is an anion of a weak, organic acid of the formula QH having a pK$_a$ of 20 to 35, the weight of the quaternary ammonium compound being about 0.01% to 10% by weight of the methyl methacrylate.

9. A process according to claim 8 in which the quaternary ammonium compound is 9-fluorenyl tetraethylammonium.

10. A process for forming polymers of butyl methacrylate which comprises polymerizing butyl methacrylate under anhydrous and anaerobic conditions between —70° C. and about 70° C. with a quaternary ammonium compound of the structure

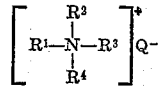

wherein R$^1$, R$^2$, R$^3$, and R$^4$ when taken individually are members of the class consisting of alkyl, cycloalkyl, aralkyl, and phenyl groups and, when two of these are taken together, they represent a member of the class consisting of —CH$_2$CH$_2$CH$_2$CH$_2$—,

—CH$_2$CH$_2$CH$_2$CH$_2$CH$_2$—, —CH$_2$CH$_2$OCH$_2$CH$_2$— which with the nitrogen forms a heterocycle, and Q is an anion of a weak, organic acid of the formula QH having a pK$_a$ of 20 to 35, the weight of the quaternary ammonium compound being about 0.01% to 10% by weight of the butyl methacrylate.

11. A process for forming polymers of ethyl acrylate which comprises polymerizing ethyl acrylate under anhydrous and anaerobic conditions between —70° C. and about 70° C. with a quaternary ammonium compound of the structure

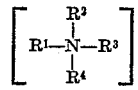

wherein R$^1$, R$^2$, R$^3$, and R$^4$ when taken individually are members of the class consisting of alkyl, cycloalkyl, aralkyl, and phenyl groups and, when two of these are taken together, they represent a member of the class consisting of —CH$_2$CH$_2$CH$_2$CH$_2$—,

—CH$_2$CH$_2$CH$_2$CH$_2$CH$_2$—, —CH$_2$CH$_2$OCH$_2$CH$_2$— which with the nitrogen forms a heterocycle, and Q is an anion of a weak, organic acid of the formula QH having a pK$_a$ of 20 to 35, the weight of the quaternary ammonium compound being about 0.01% to 10% by weight of the ethyl acrylate.

References Cited in the file of this patent

UNITED STATES PATENTS

| | | |
|---|---|---|
| 2,608,555 | Bullitt | Aug. 26, 1952 |
| 2,744,105 | Barney | May 1, 1956 |
| 2,759,913 | Hulse | Aug. 21, 1956 |
| 2,870,118 | Bader | Jan. 20, 1959 |
| 2,946,770 | Bader et al. | July 26, 1960 |

OTHER REFERENCES

"Lange's Handbook of Chemistry," Handbook Publisher's, Inc., Sandusky, Ohio (1956), ninth edition, page 352 relied on.